(12) United States Patent
Woodward

(10) Patent No.: US 9,807,111 B1
(45) Date of Patent: Oct. 31, 2017

(54) SYSTEMS AND METHODS FOR DETECTING ADVERTISEMENTS DISPLAYED TO USERS VIA USER INTERFACES

(71) Applicant: Symantec Corporation, Mountain View, CA (US)

(72) Inventor: Christopher Woodward, Bellflower, CA (US)

(73) Assignee: Symantec Corporation, Mountain View, CA (US)

( * ) Notice: Subject to any disclaimer, the term of this patent is extended or adjusted under 35 U.S.C. 154(b) by 35 days.

(21) Appl. No.: 14/812,707

(22) Filed: Jul. 29, 2015

(51) Int. Cl.
G06F 11/00 (2006.01)
H04L 29/06 (2006.01)

(52) U.S. Cl.
CPC ...... H04L 63/1441 (2013.01); H04L 63/1408 (2013.01)

(58) Field of Classification Search
CPC .................. H04L 63/1441; H04L 63/1408
See application file for complete search history.

(56) References Cited

U.S. PATENT DOCUMENTS

| 6,282,709 | B1 | 8/2001 | Reha et al. |
| 8,375,381 | B1 | 2/2013 | Clark et al. |
| 2002/0122051 | A1 | 9/2002 | Hose et al. |
| 2006/0242712 | A1 | 10/2006 | Linn et al. |
| 2008/0046975 | A1* | 2/2008 | Boss ................. G06F 21/52 726/4 |
| 2010/0199215 | A1* | 8/2010 | Seymour ............... G06F 3/0481 715/808 |
| 2010/0229220 | A1 | 9/2010 | Tsai et al. |
| 2011/0047620 | A1 | 2/2011 | Mahaffey et al. |
| 2011/0154490 | A1 | 6/2011 | DeLuca et al. |
| 2012/0173699 | A1 | 7/2012 | Niemela |
| 2012/0243043 | A1 | 9/2012 | Asai |
| 2012/0246630 | A1 | 9/2012 | Kuzins et al. |

(Continued)

FOREIGN PATENT DOCUMENTS

WO   WO-00/60488   10/2000

OTHER PUBLICATIONS

Oren Laadan, "Capture: A desktop Display-Centric Text Recorder," Oct. 22-24, 2012 ACM, pp. 9-16.*

(Continued)

*Primary Examiner* — Luu Pham
*Assistant Examiner* — Canh Le
(74) *Attorney, Agent, or Firm* — FisherBroyles, LLP

(57) ABSTRACT

The disclosed computer-implemented method for detecting advertisements displayed to users via user interfaces may include (1) monitoring, via an accessibility API provided by an operating system of the computing device, accessibility events that indicate state transitions in user interfaces of applications running on the computing device, (2) determining, based on an analysis of at least one accessibility event, that an advertisement is being displayed to a user within a user interface of an application running on the computing device, and (3) in response to determining that the advertisement is being displayed, performing at least one action to prevent the advertisement from interfering with interactions between the user and the application. Various other methods, systems, and computer-readable media are also disclosed.

16 Claims, 9 Drawing Sheets

(56) References Cited

U.S. PATENT DOCUMENTS

| | | |
|---|---|---|
| 2013/0247021 A1 | 9/2013 | You |
| 2013/0254880 A1 | 9/2013 | Alperovitch et al. |
| 2013/0283377 A1 | 10/2013 | Das et al. |
| 2013/0333039 A1 | 12/2013 | Kelly |
| 2014/0059691 A1 | 2/2014 | Wang et al. |
| 2014/0090077 A1 | 3/2014 | Jeong et al. |
| 2014/0096246 A1 | 4/2014 | Morrissey et al. |
| 2014/0109186 A1 | 4/2014 | Oikonomidis |
| 2014/0283044 A1 | 9/2014 | Chen |
| 2014/0317610 A1 | 10/2014 | Belfoure et al. |
| 2015/0020190 A1* | 1/2015 | Lee .................. G06F 21/6209 726/16 |
| 2015/0134452 A1* | 5/2015 | Williams ........... G06Q 30/0257 705/14.55 |
| 2015/0180746 A1 | 6/2015 | Day, II et al. |
| 2016/0188312 A1 | 6/2016 | Shi et al. |

OTHER PUBLICATIONS

Michael E. Locasto et al.,"Towards Collaborative Security and P2P Intrusion Detection," 2005 IEEE, pp. 333-339.*
"Sending Simple Data to Other Apps", http://developer.android.com/training/sharing/send.html, as accessed Jan. 7, 2014, (Jan. 4, 2012).
"Google Play", http://en.wikipedia.org/wiki/Google_Play, as accessed Jan. 7, 2014, Wikipedia, (Mar. 7, 2012).
Anubhav Savant; Systems and Methods for Informing Users About Applications Available for Download; U.S. Appl. No. 14/178,279, filed Feb. 12, 2014.
Zeqing Qi, et al; Systems and Methods for Updating Applications; U.S. Appl. No. 14/305,497, filed Jun. 16, 2014.
Anubhav Savant; Systems and Methods for Providing Information Identifying the Trustworthiness of Applications on Application Distribution Platforms; U.S. Appl. No. 14/338,539, filed Jul. 23, 2014.
Anubhav Savant, et al; Systems and Methods for Modifying Applications Without User Input; U.S. Appl. No. 14/445,704, filed Jul. 29, 2014.
"AccessibilityService", http://developer.android.com/reference/android/accessibilityservice/AccessibilityService.html, as accessed May 30, 2014, Android, (Nov. 15, 2009).
"Digital distribution", http://en.wikipedia.org/wiki/Digital_distribution, as accessed May 30, 2014, Wikipedia, (Jun. 15, 2005).
"Building Accessibility Services", http://developer.android.com/guide/topics/ui/accessibility/services.html, as accessed May 30, 2014, Android, (Apr. 14, 2012).
Anubhav Savant; Systems and Methods for Evaluating Content Provided to Users via User Interfaces; U.S. Appl. No. 14/698,885, filed Apr. 29, 2015.
"ApplicationId versus PackageName", http://tools.android.com/tech-docs/new-build-system/applicationid-vs-packagename, as accessed Mar. 3, 2015, Android Tools Project Site, (Oct. 3, 2014).
Beal, Vangie "API—application program interface", http://www.webopedia.com/TERM/A/API.html, as accessed Mar. 3, 2015, Webopedia, (Jun. 21, 2000).
"AccessibilityEvent", http://developer.android.com/reference/android/view/accessibility/AccessibilityEvent.html, as accessed Mar. 3, 2015, Android Developers, (Oct. 10, 2009).
"Greenify", https://play.google.com/store/apps/details?id=com.oasisfeng.greenify&hl=en, as accessed May 30, 2014, (Jun. 19, 2013).
"Receiving Simple Data from Other Apps", http://developer.android.com/training/sharing/receive.html, as accessed Jan. 7, 2014, (Jan. 3, 2012).
Ramakrishnan Meenakshi Sundaram; Systems and Methods for Enabling Parental Control Applications to Enforce Rules on Third-Party Applications; U.S. Appl. No. 14/817,236, filed Aug. 4, 2015.
Jonathon Salehpour; Systems and Methods for Detecting When Users Are Uninstalling Applications; U.S. Appl. No. 14/824,539, filed Aug. 12, 2015.
Ramakrishnan Meenakshi Sundaram; Systems and Methods for Protecting Computing Devices From Imposter Accessibility Services; U.S. Appl. No. 14/837,383, filed Aug. 27, 2015.
"Is it possible to detect Android app uninstall?", http://stackoverflow.com/questions/6209730/is-it-possible-to-detect-android-app-uninstall, as accessed Jun. 25, 2015, Stack Overflow, (Jun. 2, 2011).
"Android not receiving Intent Action_Package_Removed in the removed package", http://stackoverflow.com/questions/3648166/android-not-receiving-intent-action-package-removed-in-the-removed-package, as accessed Jun. 25, 2015, Stack Overflow, (Sep. 5, 2010).
"PackageInstaller", https://developer.android.com/reference/android/content/pm/PackageInstaller.html, as accessed Jun. 25, 2015, Android Developers, (Oct. 20, 2014).
"AccessibilityService", http://developer.android.com/reference/android/accessibilityservice/AccessibilityService.html, as accessed Jun. 25, 2015, Android Developers, (Nov. 15, 2009).
"Developing an Accessibility Service", http://developer.android.com/training/accessibility/service.html, as accessed Jun. 25, 2015, Android Developers, (Apr. 13, 2012).
"AlertDialog", http://developer.android.com/reference/android/app/AlertDialog.html, as accessed Jun. 25, 2015, Android Developers, (Feb. 18, 2009).
"Artimys", https://artimysapi.appspot.com/, as accessed Jun. 4, 2015, (2013).
Coyne, Sarah M., et al., "Profanity in Media Associated With Attitudes and Behavior Regarding Profanity Use and Aggression", http://pediatrics.aappublications.org/content/early/2011/10/14/peds.2011-1062.abstract, as accessed Jun. 4, 2015, Pediatrics, American Academy of Pediatrics, (Oct. 17, 2011).
"android.accessibilityservice", https://developer.android.com/reference/android/accessibilityservice/package-summary.html, as accessed Jun. 4, 2015, Android Developers, (Sep. 22, 2009).
Kraunelis, Joshua et al., "On Malware Leveraging the Android Accessibility Framework", http://www.umac.mo/rectors_office/docs/weizhao_cv/pub_refereed_journals/2015_ref_journals/On%20Malware.pdf, as accessed Jun. 4, 2015, ICST Transactions Preprint, (2013 or earlier).
"Adblock Plus", https://adblockplus.org/, as accessed Jun. 4, 2015, (Aug. 21, 2006).
"AccessibilityEvent", http://developer.android.com/reference/android/view/accessibility/AccessibilityEvent.html, as accessed Jun. 4, 2015, Android Developers, (Oct. 10, 2009).

* cited by examiner

SYSTEMS AND METHODS FOR DETECTING ADVERTISEMENTS DISPLAYED TO USERS VIA USER INTERFACES

BACKGROUND

Applications, online services, and/or websites may allow individuals or organizations to display advertisements alongside (or on top of) their own content. While advertisements may produce revenue for the creators of an application, they may also interfere with interactions between users and the application. For example, a pop-up advertisement may distract a user or block content hosted by an application that a user is trying to view. In addition, in some cases, attempting to remove or close an advertisement may direct a user to undesirable or potentially malicious content.

Unfortunately, traditional methods for preventing advertisements from being displayed to users may be unable to efficiently and/or effectively identify and block some advertisements. For example, a conventional ad-blocking technology may monitor network traffic to determine that a website is distributing an advertisement to a user's computing device. Such technologies may require a Virtual Private Network (VPN), which may result in excessive consumption of time and computing resources. For example, implementing a VPN to analyze traffic distributed to a computing device for advertisements may slow down or interfere with the transfer of traffic unrelated to advertisements. Therefore, the current application identifies and addresses a need for improved systems and methods for detecting advertisements displayed to users within applications.

SUMMARY

As will be described in greater detail below, the instant disclosure describes various systems and methods for detecting advertisements displayed to users via user interfaces by monitoring accessibility events that describe state transitions in user interfaces of applications running on a computing device. In the event that an analysis of an accessibility event indicates that an advertisement is being displayed to a user, the systems and methods described herein may perform actions such as closing the advertisement or blocking the advertisement from the view of the user.

In one example, a computer-implemented method for performing such a task may include (1) monitoring, via an accessibility Application Program Interface (API) provided by an operating system of the computing device, accessibility events that indicate state transitions in user interfaces of applications running on the computing device, (2) determining, based on an analysis of at least one accessibility event, that an advertisement is being displayed to a user within a user interface of an application running on the computing device, and (3) in response to determining that the advertisement is being displayed, performing at least one action to prevent the advertisement from interfering with interactions between the user and the application.

In some examples, determining that the advertisement is being displayed to the user may include determining that information within the accessibility event indicates that content within the user interface is an advertisement. In other examples, determining that the advertisement is being displayed to the user may include identifying the application running on the computing device based on information within the accessibility event and then determining that the application is an application likely to display advertisements. In some embodiments, determining that the application is likely to display advertisements may include determining that the application provides the user with services via a network and/or that the application is known to host advertisements provided by third-party organizations.

After determining that the application is likely to display advertisements, the method may include querying, via the accessibility API, the user interface of the application to identify the advertisement within the user interface. In some examples, querying the user interface may include analyzing the user interface based on characteristics of the application that indicate potential locations of advertisements within the user interface.

In some embodiments, performing the action to prevent the advertisement from interfering with interactions between the user and the application may include closing the advertisement. In other embodiments, performing the action may include overlaying an additional user interface on the advertisement that blocks the advertisement from the view of the user. Additionally or alternatively, performing the action may include preventing the advertisement from directing the user to content external to the application.

In one embodiment, a system for implementing the above-described method may include (1) a monitoring module that monitors, via an accessibility API provided by an operating system of a computing device, accessibility events that indicate state transitions in user interfaces of applications running on the computing device, (2) a determination module that determines, based on an analysis of at least one accessibility event, that an advertisement is being displayed to a user within a user interface of an application running on the computing device, and (3) a performance module that performs, in response to the determination that the advertisement is being displayed, at least one action to prevent the advertisement from interfering with interactions between the user and the application. In addition, the system may include at least one physical processor configured to execute the monitoring module, the determination module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) monitor, via an accessibility API provided by an operating system of the computing device, accessibility events that indicate state transitions in user interfaces of applications running on the computing device, (2) determine, based on an analysis of at least one accessibility event, that an advertisement is being displayed to a user within a user interface of an application running on the computing device, and (3) in response to determining that the advertisement is being displayed, perform at least one action to prevent the advertisement from interfering with interactions between the user and the application.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
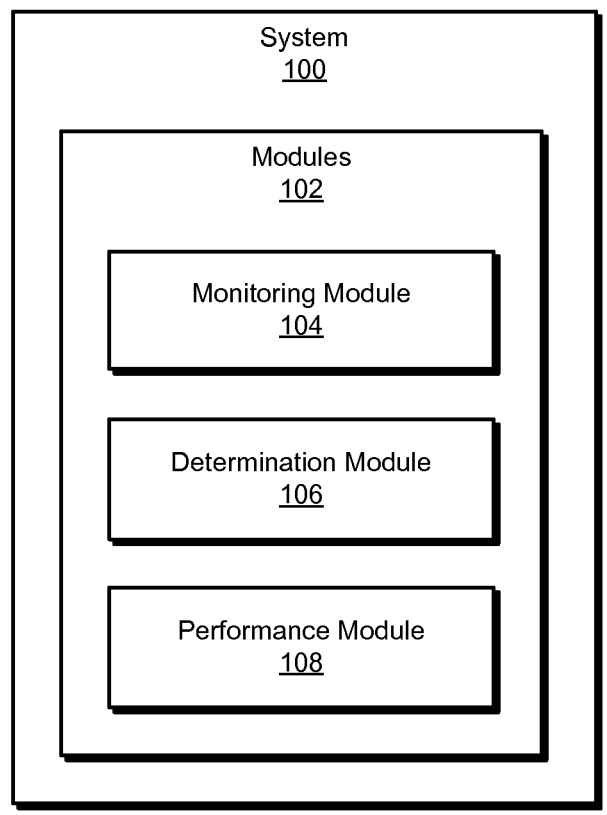
FIG. 1 is a block diagram of an exemplary system for detecting advertisements displayed to users via user interfaces.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting advertisements displayed to users via user interfaces. As will be explained in greater detail below, by monitoring and analyzing accessibility events generated by an accessibility service of a computing device, the systems and methods described herein may determine that an application running on the computing device is currently displaying an advertisement within a user interface. For example, the disclosed systems and methods may determine that a state transition of a user interface described by an accessibility event indicates that a user may be viewing an advertisement (without having to intercept communications from a server or database that provided the advertisement). By determining that a user is currently viewing an advertisement, the disclosed systems and methods may take actions to prevent the advertisement from distracting, annoying, and/or potentially harming the user or the user's computing device.

Figure 2:
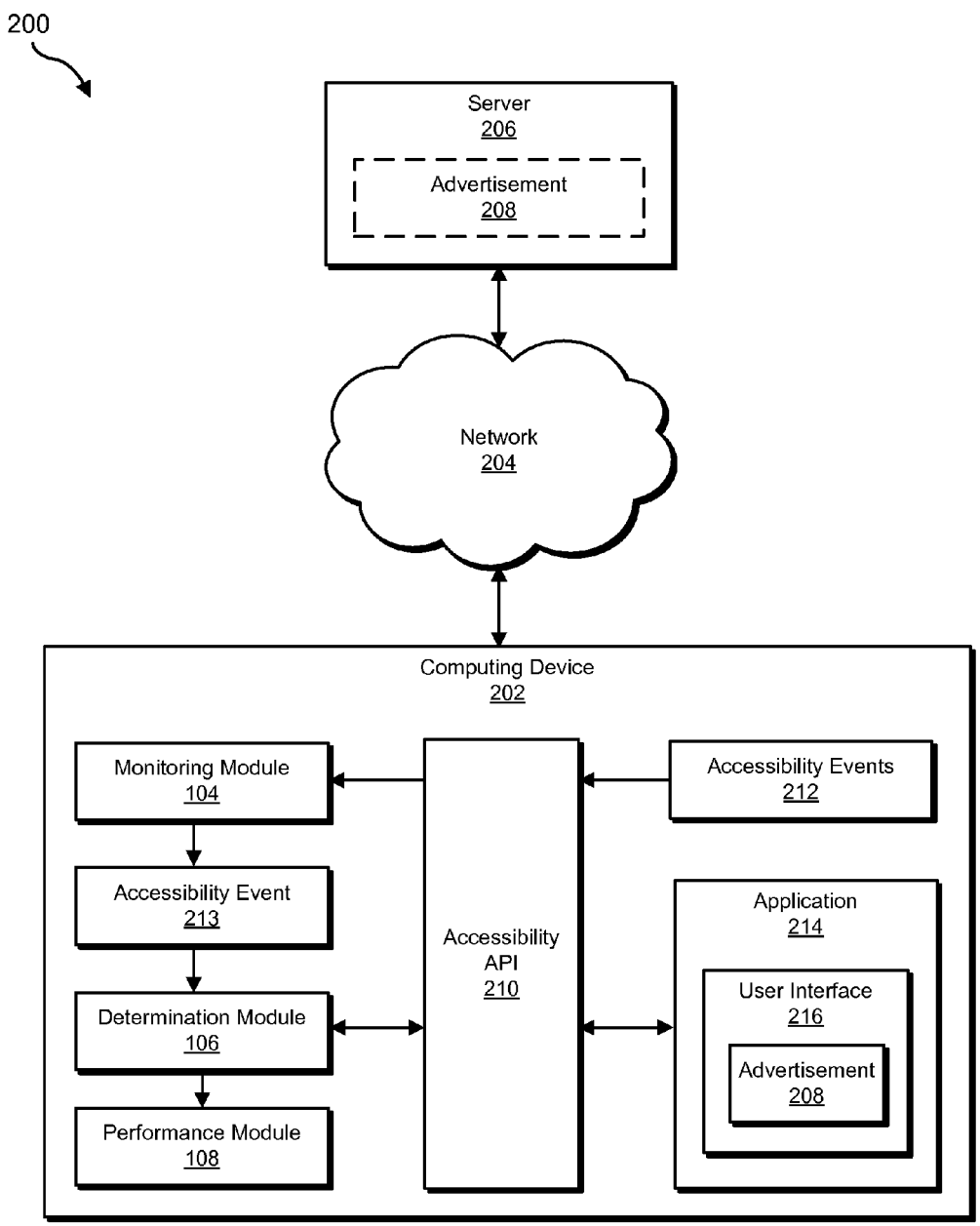
FIG. 2 is a block diagram of an additional exemplary system for detecting advertisements displayed to users via user interfaces.

The following will provide, with reference to FIGS. 1 and 2, detailed descriptions of exemplary systems for detecting advertisements displayed to users via user interfaces. Detailed descriptions of corresponding computer-implemented methods will also be provided in connection with FIGS. 3-7. In addition, detailed descriptions of an exemplary computing system and network architecture capable of implementing one or more of the embodiments described herein will be provided in connection with FIGS. 8 and 9, respectively.

FIG. 1 is a block diagram of an exemplary system 100 for detecting advertisements displayed to users via user interfaces. As illustrated in this figure, exemplary system 100 may include one or more modules 102 for performing one or more tasks. For example, and as will be explained in greater detail below, exemplary system 100 may include a monitoring module 104 that monitors, via an accessibility API provided by an operating system of a computing device, accessibility events that indicate state transitions in user interfaces of applications running on the computing device. Exemplary system 100 may also include a determination module 106 that determines, based on an analysis of at least one accessibility event, that an advertisement is being displayed to a user within a user interface of an application running on the computing device.

In addition, and as will be described in greater detail below, exemplary system 100 may include a performance module 108 that performs, in response to the determination that the advertisement is being displayed, at least one action to prevent the advertisement from interfering with interactions between the user and the application. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202), computing system 810 in FIG. 8, and/or portions of exemplary network architecture 900 in FIG. 9. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In the example of FIG. 2, modules 102 may reside client-side on computing device 202. In this example, modules 102 may represent all or a portion of an advertisement-blocking application downloaded onto computing device 202. Furthermore, in some examples, one or more of modules 102 may be in communication with an external server or database not shown in FIG. 2 (e.g., a server that operates in conjunction with the advertisement-blocking application to identify and block advertisements on user's computing devices).

In one embodiment, one or more of modules 102 from FIG. 1 may, when executed by at least one processor of computing device 202, enable computing device 202 to detect advertisements that are being displayed to users within user interfaces. For example, and as will be described in greater detail below, monitoring module 104 may cause computing device 202 to monitor, via an accessibility API 210 provided by an operating system of computing device 202, accessibility events 212 that indicate state transitions in user interfaces of applications running on computing device 202. In addition, determination module 106 may cause computing device 202 to determine, based on an analysis of at least one of accessibility events 212 (e.g., accessibility event 213), that an advertisement 208 is being displayed to a user within a user interface 216 of an application 214 that is running on computing device 202. In response to the determination that advertisement 208 is being displayed to the user, performance module 108 may cause computing device 202 to perform at least one action to prevent advertisement 208 from interfering with interactions between the user and application 214.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 810 in FIG. 8, or any other suitable computing device.

Server 206 generally represents any type or form of computing device that is capable of storing, hosting, and/or providing advertisements. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 900 in FIG. 9, or the like. Network 204 may facilitate communication or data transfer using wireless or wired connections. In one embodiment, network 204 may facilitate providing advertisement 208 from server 206 to an application that is displaying advertisement 208 to a user of computing device 202.

Figure 3:
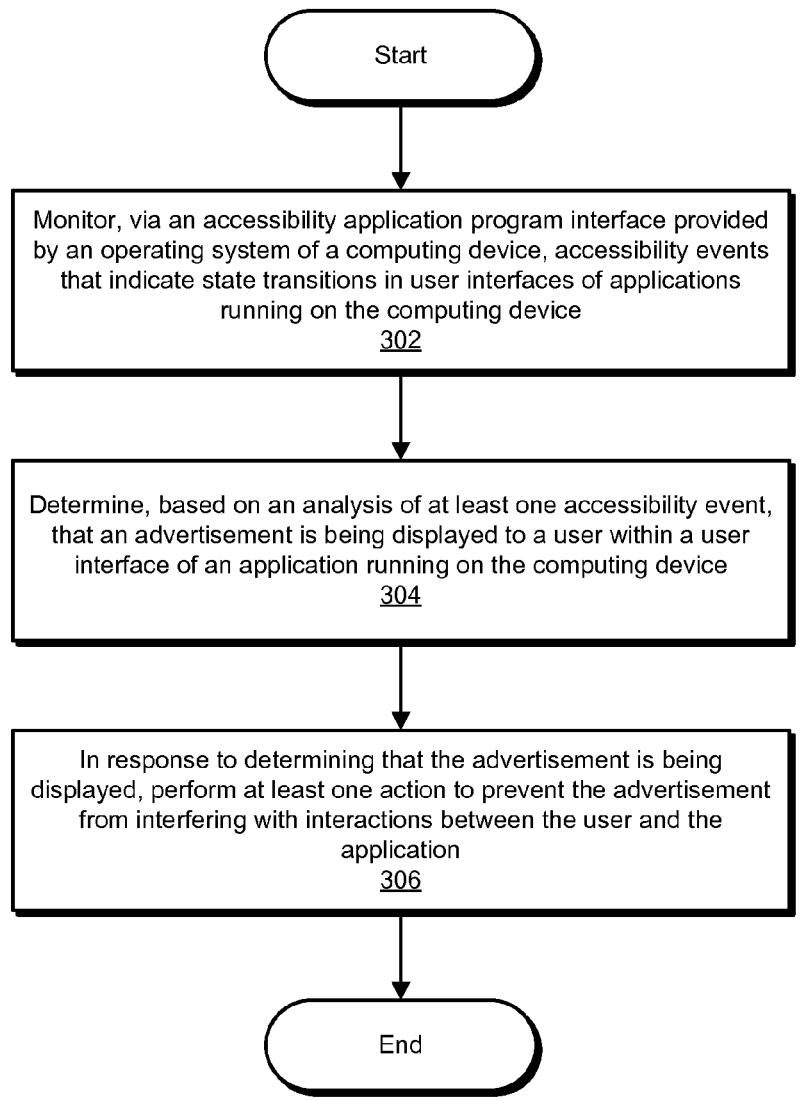
FIG. 3 is a flow diagram of an exemplary method for detecting advertisements displayed to users via user interfaces.

FIG. 3 is a flow diagram of an exemplary computer-implemented method 300 for detecting advertisements displayed to users via user interfaces. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 810 in FIG. 8, and/or portions of exemplary network architecture 900 in FIG. 9.

As illustrated in FIG. 3, at step 302 one or more of the systems described herein may monitor, via an accessibility API provided by an operating system of a computing device, accessibility events that indicate state transitions in user interfaces of applications running on the computing device. For example, monitoring module 104 may, as part of computing device 202 in FIG. 2, monitor, via accessibility API 210, accessibility events 212 that indicate state transitions in user interfaces of applications running on computing device 202.

The term "accessibility event," as used herein, generally refers to any type or form of notification or message that contains information about one or more state transitions of a user interface. The phrase "state transition of a user interface," as used herein, generally refers to any type or form of change within a user interface and/or interaction between a user and a user interface. In some examples, a state transition of a user interface may occur as the result of a user providing input to the user interface, such as a user clicking a button within the user interface, changing the focus of the user interface (e.g., by zooming in), and/or entering text into an input field within the user interface. Additionally or alternatively, a state transition of a user interface may occur as the result of an application running on a computing device, such as text or audio content being displayed to a user, a new window of an application opening, and/or an application requesting user input. In some examples, an operating system of a computing device may detect and/or identify state transitions within the active window of the computing device. The term "active window" as used herein, generally refers to any user interface, notification, or audio-visual display that is currently presented to a user on the screen of a computing device.

In some embodiments, an operating system of a computing device may communicate details about state transitions in user interfaces by providing accessibility events to an accessibility service running on the computing device. The term "accessibility service," as used herein, generally refers to any type of form of application that monitors user interfaces of a computing device. Typically, an accessibility service may monitor user interfaces of a computing device in order to notify a user of the computing device about content within the user interfaces. For example, a typical accessibility service may assist users with audio or visual impairments (e.g., by reading text displayed on a screen, highlighting or enlarging certain elements of a user interface, etc.). Additionally or alternatively, a typical accessibility service may assist users who are temporarily unable to fully interact with their computing device. As will be explained in greater detail below, the systems described herein may be implemented as an accessibility service, but may not act as a typical accessibility service.

Accessibility services may receive accessibility events containing any of a variety of information describing a state transition within a user interface. For example, an accessibility event may include the type of a state transition, the origin, source, and/or context of the state transition, specific text or elements involved in the state transition, the time at which the state transition occurred, and/or any additional information relevant to the state transition.

In some examples, an operating system of a computing device may automatically populate accessibility events with basic information such as the type of an event and/or the time at which the event occurred. Furthermore, in some examples, an accessibility service may request additional information to be included within an event, such as specific details about the source of an event and/or the elements within a user interface involved in an event. Moreover, an accessibility service may require certain permissions in order to access and/or receive certain information associated with accessibility events.

In some embodiments, an operating system may provide accessibility events to an accessibility service via an accessibility API. The term "application program interface," as used herein, generally refers to any type or form of protocol, technique, or tool for interfacing applications and/or components of applications. An API may transfer information or data from one application to another, enable one application to integrate its functionality into another application, provide graphical user interfaces to users, enable an application to query another application for specific information, and/or perform any suitable function within or between software applications. The term "accessibility API," as used herein, generally refers to any type or form of API that facilitates the transfer of information associated with state transitions in user interfaces. As will be explained in greater detail below, an accessibility API may enable an accessibility service to receive accessibility events from an operating system and/or query an application about content displayed on a user interface of the application.

The systems described herein may monitor accessibility events in a variety of ways. In some examples, one or more of modules 102 (e.g., as all or a portion of an advertisement-blocking application) may be configured and registered as an accessibility service or similar service. The advertisement-blocking application may be configured as an accessibility service designed to operate on any of a variety of mobile and non-mobile platforms, such as ANDROID, iOS, WINDOWS, and/or UNIX systems. In some examples, the advertisement-blocking application may be unable to receive accessibility events via an accessibility API before a user provides the advertisement-blocking application with permissions required by an accessibility service. As such, monitoring module 104 may prompt (by, e.g., displaying a pop-up window or notification within a user interface) a user to enable the required permissions.

While all or a portion of the systems described herein may be implemented as an advertisement-blocking application that is registered as an accessibility service, the systems described herein may not necessarily perform the duties typically associated with an accessibility service (e.g., providing user interface enhancements for disabled individuals). Instead, the systems described herein may leverage the framework of an accessibility service in order to monitor content provided to users via user interfaces.

After modules 102 are registered as a service that has access to an accessibility API, monitoring module 104 may receive accessibility events via the accessibility API. In some examples, the operating system of the computing device on which modules 102 are implemented may forward accessibility events to monitoring module 104 in response to each state transition that occurs within a user interface on the computing device. However, in other examples, monitoring module 104 may request only accessibility events that describe certain types of events. For example, monitoring module 104 may request accessibility events that directly indicate that a user interface is currently displaying an advertisement to a user and/or accessibility events associated with applications that are known to or may potentially display advertisements, such as applications that access the internet (e.g., web browser applications) and applications known to host advertisements (e.g., gaming applications).

Returning to FIG. 3, at step 304 one or more of the systems described herein may determine, based on an analysis of at least one accessibility event, that an advertisement is being displayed to a user within a user interface of an application running on the computing device. For example, determination module 106 may, as part of computing device 202 in FIG. 2, determine, based on an analysis of accessibility event 213, that advertisement 208 is being displayed to a user within user interface 216 of application 214.

The term "advertisement," as used herein, generally refers to any type or form of content within a user interface that is not directly related to the functionality of an application that is displaying the user interface. In some examples, individuals and/or organizations may pay an application developer to host advertisements of their products within an application. Advertisements may be displayed in any size or format, such as next to and/or on top of content of an application. In addition, some advertisements may contain and/or represent links that direct a user to a website or other content hosted by a creator of the advertisement.

Applications may receive and display advertisements in a variety of ways. In some examples, applications may receive advertisements via a network. In these examples, applications may periodically request and/or receive new or updated advertisements to display within their user interfaces. In one example, as shown within FIG. 2, advertisement 208 may reside within server 206. In this example, application 214 may be configured to receive advertisement 208 from server 206 via network 204 and then display advertisement 208 within user interfaces of application 214.

The systems described herein may analyze an accessibility event to determine that an advertisement is being displayed in a variety of ways. In some examples, monitoring module 104 may forward all or a portion of accessibility events received via an accessibility API to determination module 106. In the event that monitoring module 104 did not request to only receive accessibility events associated with particular applications, determination module 106 may analyze accessibility events forwarded from monitoring module 104 to determine which accessibility events indicate that a user is viewing user interfaces of the particular applications. For example, determination module 106 may filter out accessibility events associated with applications unlikely to display advertisements, such as phone applications, calendar applications, camera applications, applications that do not access the internet, etc.

In some examples, determination module 106 may determine that information within an accessibility event indicates that content within a user interface is an advertisement. For example, determination module 106 may determine that an accessibility event includes a direct indication of the presence of an advertisement and/or information that identifies an advertisement (such as a name, type, version, origin, and/or generator of the advertisement). Specifically, some applications may include identifications or labels of advertisements in their user interfaces. An accessibility API may recognize the information that identifies an advertisement and include that information within an accessibility event, where it may be identified by determination module 106.

Figure 4:
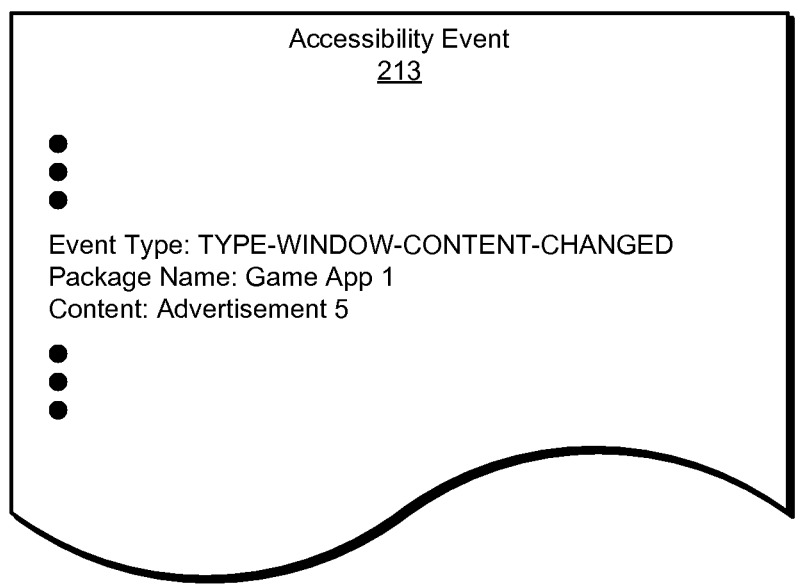
FIG. 4 is an illustration of an exemplary accessibility event.

As an example of information that identifies an advertisement within an accessibility event, FIG. 4 illustrates a portion of the information that may be included in one embodiment of accessibility event 213. In this example, accessibility event 213 may represent an accessibility event provided by an ANDROID operating system. As shown in FIG. 4, accessibility event 213 may include an event type of a state transition (in this example, "TYPE WINDOW CONTENT CHANGED") and a package name of the application involved in the state transition (in this example, "Game App 1"). In addition, accessibility event 213 may include a description of the content of the user interface involved in the state transition. Specifically, accessibility event 213 may indicate that the user interface is currently displaying an advertisement identified as "Advertisement 5." In this example, determination module 106 may determine that a user is currently viewing an advertisement based on identifying the indication of "Advertisement 5" within accessibility event 213.

In other examples, an accessibility event may not directly indicate the presence of an advertisement within a user interface. For example, an accessibility event may not describe all of the content of a user interface and/or an application may not identify advertisements within its user interfaces such that an accessibility API can report the advertisements in accessibility events. In these examples, determination module 106 may determine whether a user is currently viewing an advertisement by determining that an application that is currently running on a computing device is likely to display advertisements and then analyzing a user interface of the application for an indication of an advertisement.

In the event that determination module 106 does not receive only accessibility events associated with certain applications from monitoring module 104, determination module 106 may search an accessibility event for information that identifies an application currently running on a computing device. For example, determination module 106 may search an accessibility event for a package name or source. Determination module 106 may then determine whether the application is an application that accesses a network (such as web browser applications, an application distribution platform, or a social media application), an application that is known to host advertisements provided by third-party organizations (such as gaming applications or free and/or widely-used applications), and/or any other application that is likely to or may potentially display advertisements.

Determination module 106 may determine whether an application is an application that may display advertisements in any suitable manner. In one example, after identifying an application running on a computing device, determination module 106 may determine whether the application is listed within a database (e.g., within a computing device running the application and/or an external server) that stores the types and/or names of applications known to provide advertisements.

Figure 5:
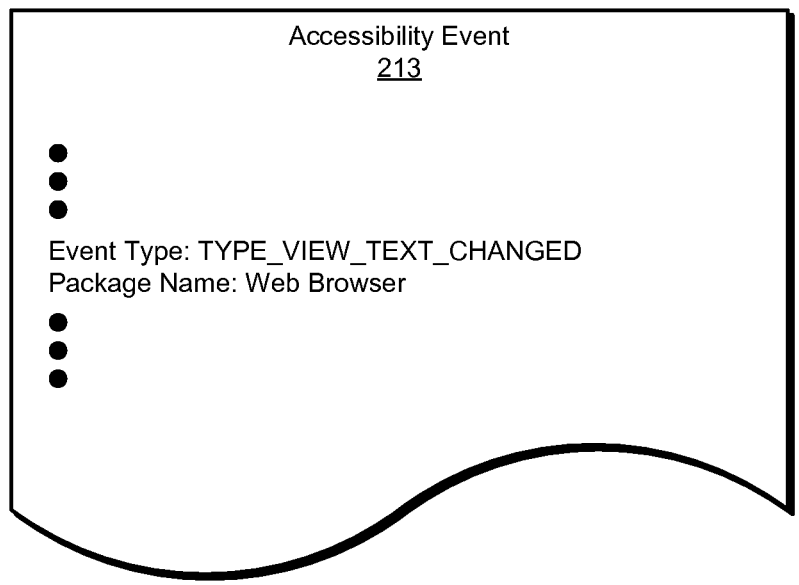
FIG. 5 is an illustration of an additional exemplary accessibility event.

As an example of an accessibility event associated with an application that may display advertisements, FIG. 5 illustrates a portion of the information that may be included in one embodiment of accessibility event 213. Similarly to accessibility event 213 within FIG. 4, accessibility event 213 within FIG. 5 may include an event type of a state transition (in this example, "TYPE_VIEW_TEXT_CHANGED") and a package name of the application involved in the state transition (in this example, "Web Browser"). In the example of FIG. 5, determination module 106 may determine that a user may currently be viewing an advertisement based on the determination that an application currently involved in a state transition of a user interface is a web browser application.

After determining that an application currently involved in a state transition is likely to display advertisements, determination module 106 may query the current user interface of the application to determine whether an advertisement is being displayed to a user. In some examples, determination module 106 may analyze the user interface (via an accessibility API) based on characteristics of the application that may indicate potential locations of advertisements within user interfaces of the application. For example, determination module 106 may determine that certain applications display advertisements in certain locations within user interfaces.

In one example, determination module 106 may determine that a certain social media application may display advertisements in a particular location (e.g., on the right side of a user interface) and that a certain gaming application displays advertisements in a different location (e.g., at the top of a user interface). As such, determination module 106 may search for advertisements within user interfaces in particular locations based on predetermined knowledge of the placement of advertisements within applications. Furthermore, determination module 106 may search in particular locations based on any additional criteria, such as a size and/or type of the computing device running an application. For example, determination module 106 may determine that one type of computing device (e.g., a smartphone) may configure user interfaces of an application in a different manner than another type of computing device (e.g., a desktop or laptop computer).

Determination module 106 may search for any type of characteristic or type of content within a user interface to identify an advertisement. For example, determination module 106 may identify an advertisement by determining that content (e.g., colors, images, and/or text) of a certain region of a user interface does not match content of the rest of the user interface. Additionally or alternatively, determination module 106 may identify an advertisement by determining that certain content within a user interface is associated with (e.g., provided by) a different source than the rest of the content within the user interface. For example, determination module 106 may identify an advertisement within a certain region of a user interface that contains a link to or is in communication with a server or website that provides advertisements. In some examples, in addition to identifying the presence of an advertisement, determination module 106 may identify characteristics such as a size and/or shape of the advertisement.

Figure 6:
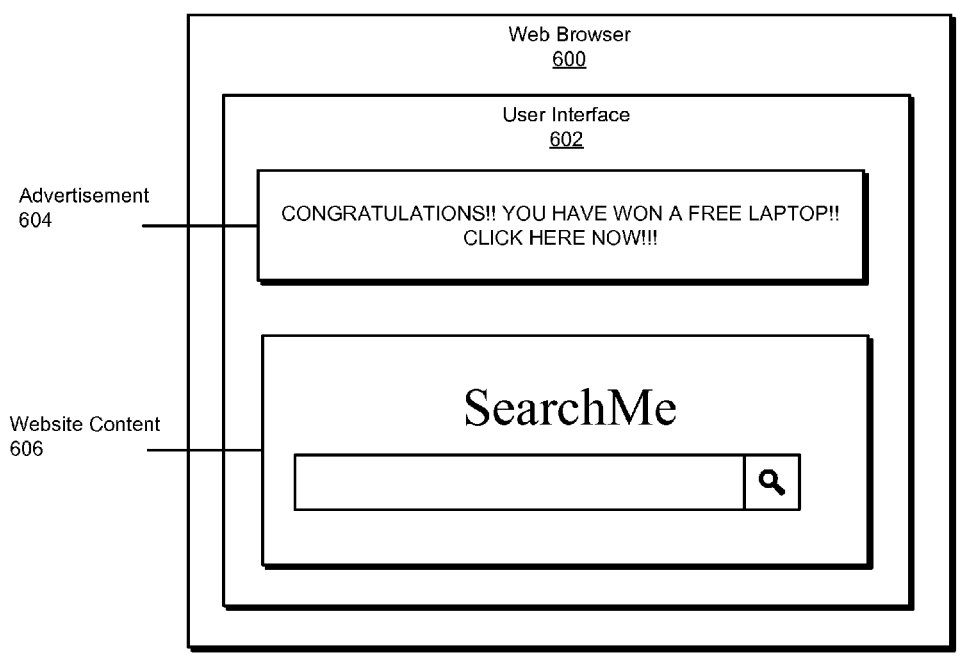
FIG. 6 is an illustration of an exemplary advertisement displayed to a user.

As an example of an advertisement within a user interface, FIG. 6 illustrates an exemplary advertisement displayed within a web browser application. In this example, web browser 600 may correspond to the web browser application involved in the state transition described by accessibility event 213 in FIG. 5. As shown in FIG. 6, web browser 600 may display a user interface 602 that includes website content 606. In this example, website content 606 may contain a search bar of the web browser application. In response to identifying the web browser application within accessibility event 213, determination module 106 may analyze user interface 602 based on characteristics of the web browser application. For example, determination module 106 may determine that the web browser application generally displays advertisements at the top of user interfaces. Accordingly, determination module 106 may identify an advertisement 604 within the top portion of user interface 602.

Notably, the systems described herein may identify advertisements within user interfaces based solely on analyses of accessibility events and/or content of user interfaces. In contrast to some traditional advertisement-blocking technologies, the disclosed systems may detect advertisements within user interfaces of computing devices without intercepting and analyzing network traffic distributed to the computing devices that contains the advertisements.

Returning to FIG. 3, at step 306 one or more of the systems described herein may perform, in response to determining that the advertisement is being displayed, at least one action to prevent the advertisement from interfering with interactions between the user and the application. For example, performance module 108 may, as part of computing device 202 in FIG. 2, perform, in response to the determination that advertisement 208 is being displayed, at least one action to prevent advertisement 208 from interfering with interactions between the user and application 214.

The systems described herein may perform an action to prevent an advertisement from interfering with interactions between a user and an application in a variety of ways. In some examples, performance module 108 may remove an identified advertisement from a user interface. For example, performance module 108 may close an advertisement (e.g., by clicking, via an application program interface, a button within the advertisement that closes the advertisement). In this way, performance module 108 may prevent an advertisement (such as a pop-up advertisement) from partially or fully obscuring important information within a user interface.

In other examples, performance module 108 may be unable to close an advertisement. For example, performance module 108 may determine that an advertisement does not have a button that enables a user or application to close the advertisement (e.g., the advertisement may be built into the configuration of a user interface). In these examples, performance module 108 may cover up the advertisement such that the advertisement is no longer displayed to a user. Specifically, performance module 108 may overlay an additional user interface on the advertisement that blocks the advertisement from the view of the user. As such, performance module 108 may prevent a user from viewing distracting, obnoxious, and/or inappropriate content within an advertisement.

Performance module 108 may overlay an additional user interface on an advertisement in a variety of ways. In one example, performance module 108 may overlay a box (e.g., a solid-colored box or a patterned box) on top of an advertisement that is the same shape and size as the advertisement. In another example, performance module 108 may provide an indication in the overlay that an advertisement is being blocked. For example, performance module 108 may cover up an advertisement with a box that contains text such as "an advertisement has been blocked." In a further example, performance module 108 may attempt to completely erase the presence of an advertisement by overlaying an additional user interface that matches the background and/or content of the user interface in which the advertisement is displayed.

Figure 7:
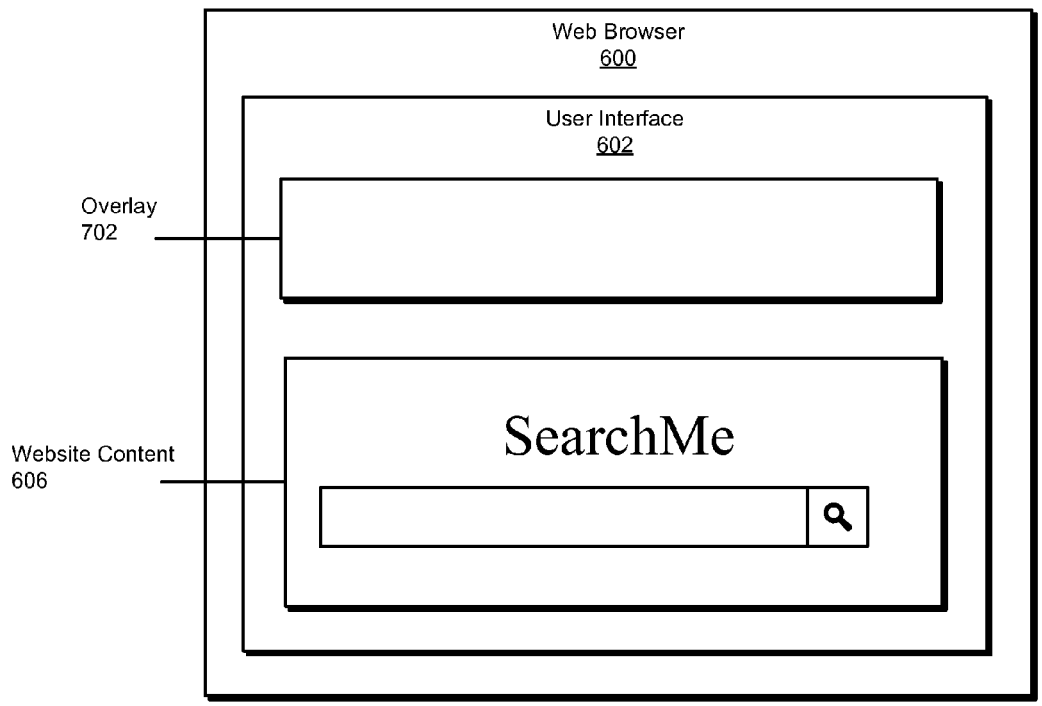
FIG. 7 is an illustration of an exemplary user interface placed over an advertisement to block the advertisement from the view of a user.

As an example of blocking an advertisement from the view of a user, FIG. 7 illustrates an overlay 702. In this example, overlay 702 may be placed over advertisement 604 illustrated within FIG. 6. As shown in FIG. 7, overlay 702 may consist of a white box that is the same size and shape as advertisement 604. Notably, in this example, website content 606 may still be displayed, without obstruction, to the user viewing user interface 602.

In some embodiments, performance module 108 may prevent an advertisement from interfering with interactions between a user and an application by preventing the advertisement from directing the user to content external to an application that is displaying the advertisement. For example, some advertisements may contain or represent links that direct users to websites configured to sell advertised products and/or to websites that contain malicious files. As such, performance module 108 may perform any suitable action to prevent a user from intentionally or inadvertently clicking on an advertisement that may direct the user to undesirable and/or potentially harmful content. In one example, performance module 108 may close an advertisement before a user is able to (i.e., has enough time to) click on the advertisement. In another example, performance module 108 may overlay a user interface on top of an advertisement that prevents the user from providing any input to the advertisement. In a further example, performance module 108 may intercept an attempt by an advertisement to direct a user to external content and block the attempt before the user is re-directed.

As explained above, an advertisement-blocking application running on a computing device may monitor accessibility events generated by the computing device. Based on an analysis of an accessibility event and/or a user interface of an application running on the computing device, the advertisement-blocking application may determine that an advertisement is currently being displayed to a user within the user interface. After determining that the user is viewing the advertisement, the advertisement-blocking application may close the advertisement, cover up the advertisement, or otherwise prevent the advertisement from interfering with interactions between the user and the application displaying the advertisement.

Figure 8:
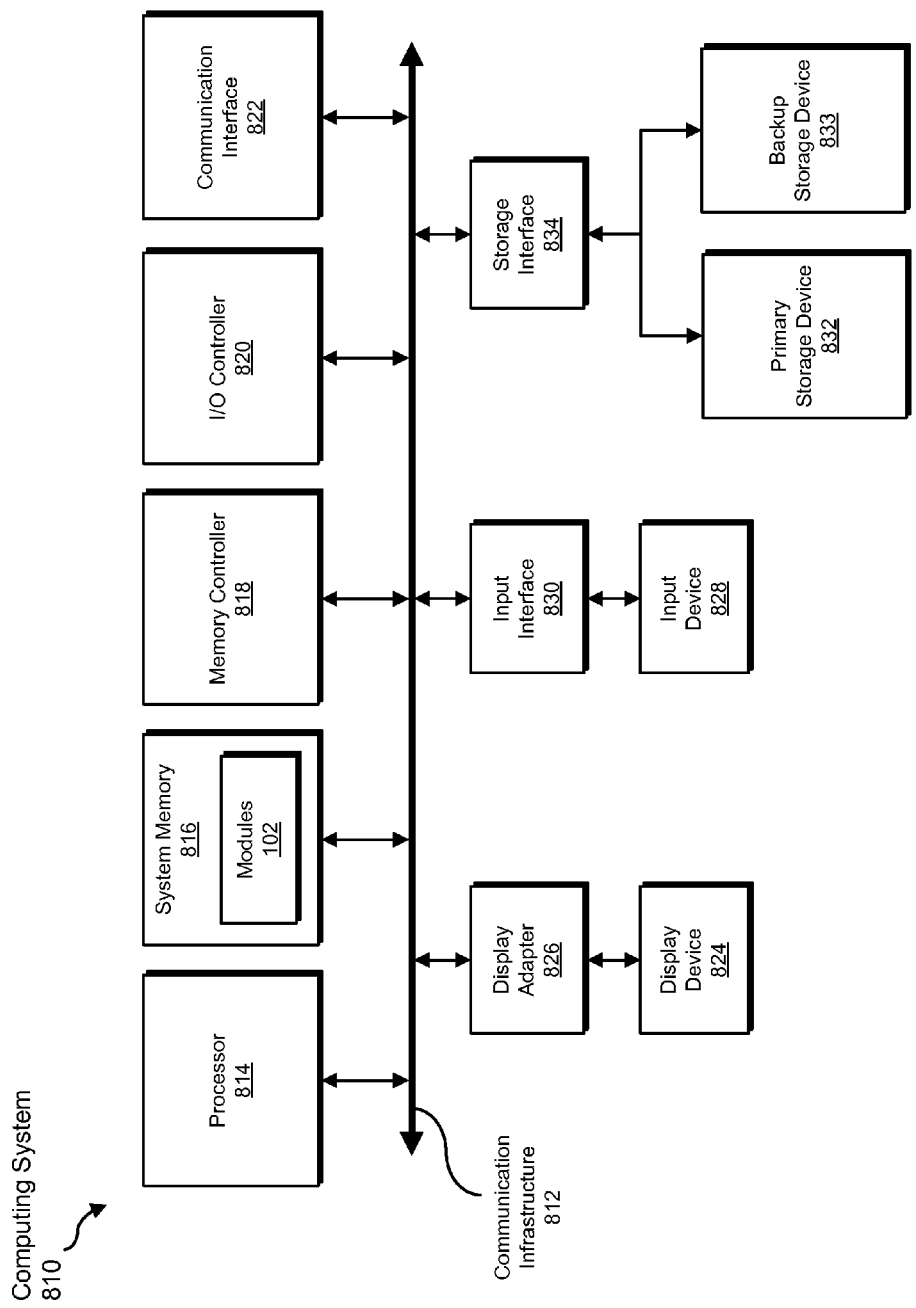
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without t limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the exemplary embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an Application Specific Integrated Circuit (ASIC) adapted to implement one or more of the exemplary embodiments disclosed herein.

Figure 9:
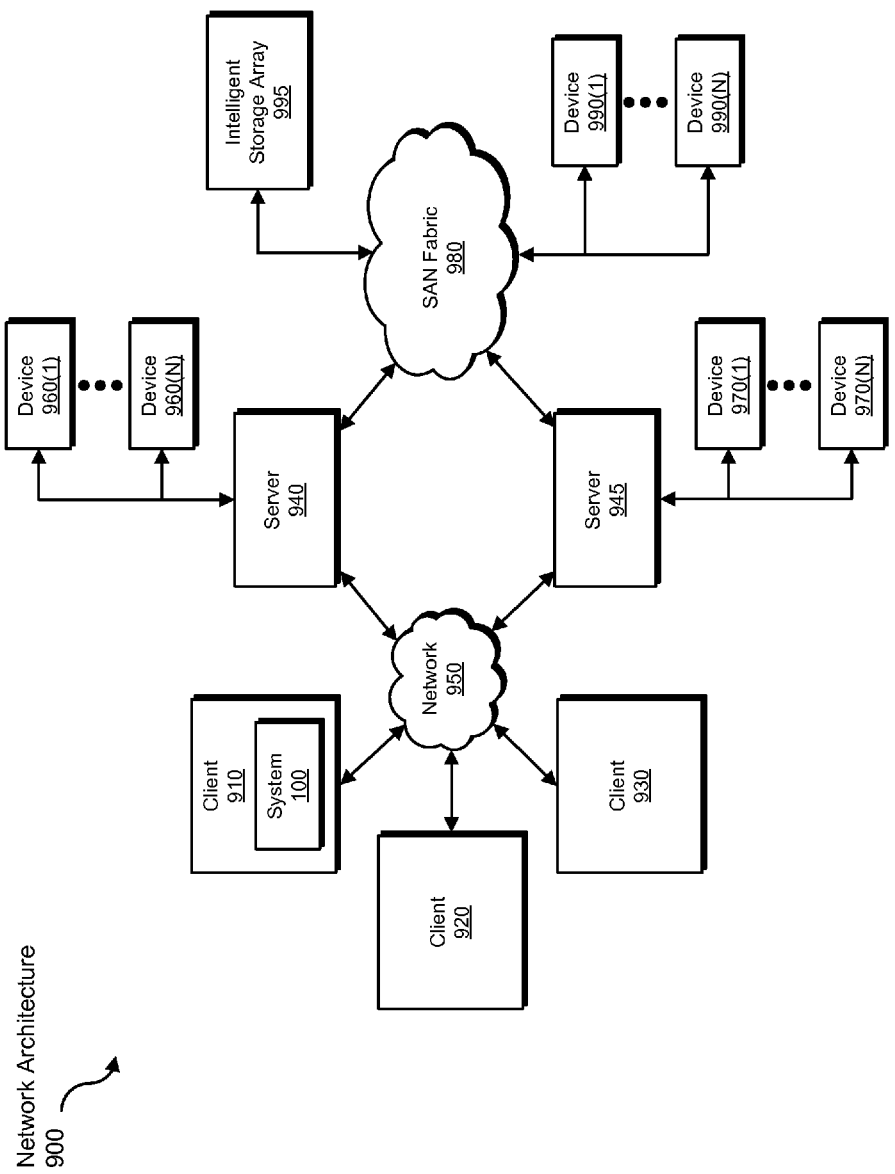
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the instant disclosure.

Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an exemplary method for detecting advertisements displayed to users via user interfaces.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive an accessibility event to be transformed, transform the accessibility event into an indication that a user is viewing an advertisement, output a result of the transformation to an application displaying the advertisement, use the result of the transformation to prevent the advertisement from interfering with interactions between the user and the application, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting advertisements displayed to users via user interfaces, at least a portion of the method being performed by a computing device comprising at least one processor, the method comprising:

registering a program installed on the computing device as an accessibility service to enable the program to receive, via an accessibility application program interface provided by an operating system of the computing device, accessibility events designed to enable the accessibility service to assist impaired users when interacting with the computing device by describing changes in content of user interfaces of applications running on the computing device;

after registering the program as the accessibility service, requesting to receive, via the accessibility application program interface, accessibility events in response to the changes in the content of the user interfaces of the applications that are likely to display advertisements;

determining that at least one application running on the computing device is likely to display advertisements by determining that the application is known to host advertisements provided by third-party organizations;

determining that an advertisement is being displayed to a user within a user interface of the application running on the computing device by determining that at least one accessibility event received by the program describes that the user interface is displaying content indicative of advertisements; and in response to determining that the advertisement is being displayed, performing at least one action to prevent the advertisement from interfering with interactions between the user and the application by preventing the advertisement from directing the user to content external to the application.

2. The method of claim 1, wherein registering the program as the accessibility service comprises prompting the user to enable permissions required by the accessibility service.

3. The method of claim 1, wherein determining that the advertisement is being displayed to the user further comprises querying, via the accessibility application program interface, the user interface of the application to identify the advertisement within the user interface.

4. The method of claim 1, further comprising determining that the application is likely to display advertisements by determining that the application provides the user with services via a network.

5. The method of claim 3, wherein querying the user interface of the application to identify the advertisement comprises analyzing the user interface based on characteristics of the application that indicate potential locations of advertisements within the user interface.

6. The method of claim 1, wherein performing the action to prevent the advertisement from interfering with interactions between the user and the application further comprises closing the advertisement.

7. The method of claim 1, wherein performing the action to prevent the advertisement from interfering with interactions between the user and the application further comprises overlaying an additional user interface on the advertisement that blocks the advertisement from the view of the user.

8. A system for detecting advertisements displayed to users via user interfaces, the system comprising:

a monitoring module, stored in memory, that:

registers a program installed on a computing device as an accessibility service to enable the program to receive, via an accessibility application program interface provided by an operating system of a computing device, accessibility events designed to enable the accessibility service to assist impaired users when interacting with the computing device by describing changes in content of user interfaces of applications running on the computing device; and after registering the program as the accessibility service, requests to receive, via the accessibility application program interface, accessibility events in response to the changes in the content of the user interfaces of the applications that are likely to display advertisements;

a determination module, stored in memory, that:

determines that at least one application running on the computing device is likely to display advertisements by determining that the application is known to host advertisements provided by third-party organizations; and determines that an advertisement is being displayed to a user within a user interface of the application running on the computing device by determining that at least one accessibility event received by the program describes that the user interface is displaying content indicative of advertisements;

a performance module, stored in memory, that performs, in response to the determination that the advertisement is being displayed, at least one action to prevent the advertisement from interfering with interactions between the user and the application by preventing the advertisement from directing the user to content external to the application; and at least one physical processor configured to execute the monitoring module, the determination module, and the performance module.

9. The system of claim 8, wherein the monitoring module registers the program as the accessibility service in part by prompting the user to enable permissions required by the accessibility service.

10. The system of claim 8, wherein the determination module further determines that the advertisement is being displayed to the user by querying, via the accessibility application program interface, the user interface of the application to identify the advertisement within the user interface.

11. The system of claim 8, wherein the determination module further determines that the application is likely to display advertisements by determining that the application provides the user with services via a network.

12. The system of claim 10, wherein the determination module queries the user interface of the application to identify the advertisement by analyzing the user interface based on characteristics of the application that indicate potential locations of advertisements within the user interface.

13. The system of claim 8, wherein the performance module further performs the action to prevent the advertisement from interfering with interactions between the user and the application by closing the advertisement.

14. The system of claim 8, wherein the performance module further performs the action to prevent the advertisement from interfering with interactions between the user and the application by overlaying an additional user interface on the advertisement that blocks the advertisement from the view of the user.

15. A non-transitory computer-readable medium comprising one or more computer-executable instructions that, when executed by at least one processor of a computing device, cause the computing device to:

register a program installed on the computing device as an accessibility service to enable the program to receive, via an accessibility application program interface provided by an operating system of the computing device, accessibility events designed to enable the accessibility service to assist impaired users when interacting with the computing device by describing changes in content of user interfaces of applications running on the computing device;

after registering the program as the accessibility service, request to receive, via the accessibility application program interface, accessibility events in response to the changes in the content of the user interfaces of the applications that are likely to display advertisements;

determine that at least one application running on the computing device is likely to display advertisements by determining that the application is known to host advertisements provided by third-party organizations;

determine that an advertisement is being displayed to a user within a user interface of an the application running on the computing device by determining that at least one accessibility event received by the program describes that the user interface is displaying content indicative of advertisements; and in response to determining that the advertisement is being displayed, perform at least one action to prevent the advertisement from interfering with interactions between the user and the application by preventing the advertisement from directing the user to content external to the application.

16. The non-transitory computer-readable medium of claim 15, wherein the one or more computer-executable instructions further cause the computing device to perform the action to prevent the advertisement from interfering with interactions between the user and the application by overlaying an additional user interface on the advertisement that blocks the advertisement from the view of the user.

* * * * *